(12) United States Patent
Dong et al.

(10) Patent No.: US 12,049,208 B2
(45) Date of Patent: Jul. 30, 2024

(54) ELECTROMECHANICAL BRAKE, CONTROLLING METHOD FOR THE SAME, AND ELECTROMECHANICAL BRAKING SYSTEM

(71) Applicant: Haldex Brake Products Aktiebolag, Landskrona (SE)

(72) Inventors: Xianbin Dong, Shanghai (CN); Anders Nilsson, Shanghai (CN)

(73) Assignee: Haldex Brake Products Aktiebolag, Landskrona (SE)

( * ) Notice: Subject to any disclaimer, the term of this patent is extended or adjusted under 35 U.S.C. 154(b) by 256 days.

(21) Appl. No.: 17/727,867

(22) Filed: Apr. 25, 2022

(65) Prior Publication Data

US 2022/0242382 A1 Aug. 4, 2022

Related U.S. Application Data

(63) Continuation of application No. PCT/EP2020/079400, filed on Oct. 19, 2020.

(51) Int. Cl.
*B60T 13/74* (2006.01)
*B60T 17/22* (2006.01)
(Continued)

(52) U.S. Cl.
CPC .......... *B60T 13/748* (2013.01); *B60T 13/746* (2013.01); *B60T 17/22* (2013.01);
(Continued)

(58) Field of Classification Search
CPC .... B60T 13/748; B60T 13/746; B60T 13/741; B60T 17/22; B60T 17/221;
(Continued)

(56) References Cited

U.S. PATENT DOCUMENTS

2013/0069567 A1 3/2013 Hild

FOREIGN PATENT DOCUMENTS

| EP | 2 503 682 A1 | 9/2013 |
| JP | 2007-143311 A | 6/2007 |
| WO | 2019/185890 A1 | 10/2019 |

OTHER PUBLICATIONS

International Search Report for application PCT/EP2020/079400 dated Jan. 26, 2021.

*Primary Examiner* — Hai H Huynh
(74) *Attorney, Agent, or Firm* — Price Heneveld LLP

(57) ABSTRACT

The present application provides an electromechanical brake and the controlling method thereof, and an electromechanical braking system, relate to the technical field of brake, the electromechanical brake comprising an electric motor and an electromagnetic brake, the electric motor having a shaft and outputting a torque based on a braking demand, and the electromagnetic brake being configured for locking and releasing the shaft, the controlling method comprises controlling the electric motor and the electromagnetic brake based on the braking demand; controlling a power supply of the electromagnetic brake when the electromagnetic brake needs to release or lock the shaft; obtaining a target current value corresponding to the real-time temperature value based on temperature-current relationship data; and when a difference between the real-time current value and the target current value is greater than a preset range, adjusting a duty cycle of the driving voltage level. By obtaining the real-time current value to compare with a target current value to determine whether the driving voltage level of the electromagnetic brake needs to be adjusted or not, and in the case of need, adjusting the driving voltage level by adjusting the duty cycle, the electromagnetic brake can be adjusted to a desired operating state as quickly as possible, thereby reducing the power consumption of the electromagnetic brake.

17 Claims, 5 Drawing Sheets

(51) Int. Cl.
 *F16D 66/00* (2006.01)
 *F16D 121/20* (2012.01)
 *F16D 121/24* (2012.01)
(52) U.S. Cl.
 CPC ... *B60T 2270/406* (2013.01); *F16D 2066/001* (2013.01); *F16D 2066/003* (2013.01); *F16D 2066/005* (2013.01); *F16D 2121/20* (2013.01); *F16D 2121/24* (2013.01)
(58) Field of Classification Search
 CPC ......... B60T 2270/406; B60T 2270/414; B60T 2270/82; B60T 8/171; B60T 8/172; F16D 2121/24; F16D 2121/20; F16D 2066/001; F16D 2066/003; F16D 2066/005; B60Y 2400/81
 USPC ........................................................ 701/70
 See application file for complete search history.

ELECTROMECHANICAL BRAKE, CONTROLLING METHOD FOR THE SAME, AND ELECTROMECHANICAL BRAKING SYSTEM

CROSS REFERENCE TO RELATED APPLICATIONS

This application is a continuation of International Application PCT/EP2020/079400 with an international filing date of Oct. 19, 2020 and claiming priority to co-pending Chinese Patent Application No. CN 201911023569.9 entitled "Electromechanical brake, controlling method for the same, and electromechanical braking system", filed on Oct. 25, 2019.

FIELD OF THE INVENTION

Embodiments of the present disclosure generally relate to the technical field of a brake, and more particularly relate to a controlling method for an electromechanical brake, an electromechanical brake, and an electromechanical braking system.

BACKGROUND OF THE INVENTION

With development of electronic technologies and improvement of vehicle intelligence, a pure electromechanical brake (EMB)-by-wire system has been gradually replacing conventional hydraulic or pneumatic brakes due to its simplified structure, higher functional integration, and better matching with an unmanned drive system, and thus becomes a development orientation for future vehicle braking technologies.

Vehicle brakes are differentiated into a service brake and a parking brake. During the parking brake or during some service brake processes, there exists a circumstance of needing to hold a braking force for a long time. To save energy and reduce motor load, an electromechanical brake (i.e., a wheel-hub unit) is generally provided with a braking force holding device (i.e., an electromagnetic brake) which may hold an already generated braking force in a low energy consumption state or a zero-energy consumption state.

The electromagnetic brake controls locking and releasing of its motor shaft based on the principle of electromagnetism, i.e., locking or releasing the motor shaft upon power on. No matter which type of electromagnetic brake is adopted, a relatively large power consumption would be incurred if it is in an energized state for a long time, thereby consuming too much electricity.

SUMMARY OF THE INVENTION

The present disclosure provides a controlling method for an electromechanical brake, an electromechanical brake, and an electromechanical braking system with a lowered energy consumption of the braking system and/or with an improved control accuracy under consideration of different operational conditions.

In a first embodiment of the invention, a controlling method for an electromechanical brake is provided, the electromechanical brake comprising an electric motor and an electromagnetic brake, the electric motor having a shaft and outputting a torque based on a braking demand, and the electromagnetic brake being configured for locking and releasing the shaft, wherein the controlling method comprises:

controlling the electric motor and the electromagnetic brake based on the braking demand;
controlling a power supply of the electromagnetic brake when the electromagnetic brake needs to release or lock the shaft;
obtaining a real-time temperature value and a real-time current value of the electromagnetic brake;
obtaining a target current value corresponding to the real-time temperature value based on preset temperature-current relationship data; and
when a difference between the real-time current value and the target current value is greater than a preset range, adjusting a duty cycle of the driving voltage level to narrow down the difference.

Optionally, when the real-time current value is smaller than the target current value, increasing the duty cycle of the driving voltage level of the electromagnetic brake; and when the real-time current value is greater than the target current value, decreasing the duty cycle of the driving voltage level of the electromagnetic device.

Optionally, the duty cycle of the driving voltage level of the electromagnetic device is adjusted by varying a conduction time length, within a unit time, of a low side switch at the electromagnetic brake.

Optionally, the controlling method further comprises: obtaining an initial voltage value of the electromagnetic brake.

Optionally, the controlling method further comprises: diagnosing the electromagnetic brake.

Optionally, the diagnosing is performed based on voltage values when a high side switch and a low side switch provided at the electromagnetic brake are switched on or off.

Optionally, the preset range is dynamically adjusted based on power supply of the electromagnetic brake.

In a second embodiment of the invention, a control device of an electromechanical brake is provided, the electromechanical brake comprising an electric motor and an electromagnetic brake, the electric motor having a shaft and outputting a torque based on a braking demand, and the electromagnetic brake being configured for locking and releasing the shaft, wherein the control device further comprises:

a state control unit configured for controlling the electric motor and the electromagnetic brake based on the braking demand;
a power supply control unit configured for controlling power supply of the electromagnetic brake when the electromagnetic brake needs to release or lock the shaft;
a parameter obtaining unit configured for obtaining a real-time temperature value and a real-time current value of the electromagnetic brake;
a current value obtaining unit configured for obtaining a target current value corresponding to the real-time temperature value based on preset temperature-current relationship data; and
a duty cycle adjusting unit configured for: when a difference between the real-time current value and the target current value is greater than a preset range, adjusting a duty cycle of a driving voltage level of the electromagnetic brake to narrow down the difference.

Optionally, the duty cycle adjusting unit is configured for: when the real-time current value is smaller than the target current value, increasing the duty cycle of the driving voltage level of the electromagnetic brake; and when the real-time current value is greater than the target current value, decreasing the duty cycle of the driving voltage level of the electromagnetic device.

Optionally, the duty cycle adjusting unit is configured for adjusting the duty cycle of the driving voltage level of the electromagnetic device by varying a conduction time length, within a unit time, of a low side switch at the electromagnetic brake.

Optionally, the controlling device further comprises: a voltage value obtaining unit configured for obtaining an initial voltage value of the electromagnetic brake.

Optionally, the controlling device further comprises a diagnosing unit configured for diagnosing the electromagnetic brake.

Optionally, the diagnosing unit performs the diagnosing based on voltage values when a high side switch and a low side switch provided at the electromagnetic brake are switched on or off.

Optionally, the preset range is dynamically adjusted based on power supply of the electromagnetic brake.

In a third embodiment of the invention, an electromechanical braking system is provided, the electromechanical braking system comprising a plurality of the electromechanical brakes according to any of the alternative embodiments above, each of the electromechanical brakes corresponding to a vehicle wheel.

The technical solution of the present disclosure achieves the following technical effects:

1. By obtaining the real-time current value to compare with a target current value to determine whether the driving voltage level of the electromagnetic brake needs to be adjusted or not, and in the case of need, adjusting the driving voltage level by adjusting the duty cycle, the electromagnetic brake can be adjusted to a desired operating state as quickly as possible, thereby reducing the power consumption of the electromagnetic brake;
2. Compared with conventional adjustment manners, adjusting of the duty cycle of the conducted switches at two sides of the electromagnetic brake may reduce the energy consumption during the adjustment process;
3. By obtaining the initial voltage value of the electromagnetic brake at the initial phase of implementing the controlling method, whether the electromagnetic brake is already in a stable operating state may be determined based on the initial voltage value;
4. If the electromagnetic brake is not in a stable operating state, a detailed diagnosis is needed to find a specific cause for that. The specific diagnosing step includes: switching operating states of the electromagnetic brake via the switches provided at two sides of the electromagnetic brake, and obtaining corresponding voltage values under different states, and then performing diagnosis based on variation of the voltage value; and
5. To control the electromagnetic brake under different states, it is also needed to adjust a preset range (serving as a reference object) so as to satisfy the need of comparing with the adjusted duty cycle, such that after comparison, the duty cycle adjustment enables the electromagnetic brake to be adjusted to a low power consumption mode more quickly.

Advantageous developments of the invention result from the claims, the description and the drawings.

The advantages of features and of combinations of a plurality of features mentioned at the beginning of the description only serve as examples and may be used alternatively or cumulatively without the necessity of embodiments according to the invention having to obtain these advantages.

The following applies with respect to the disclosure—not the scope of protection—of the original application and the patent: Further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims which, however, does not apply to the independent claims of the granted patent.

The number of the features mentioned in the claims and in the description is to be understood to cover this exact number and a greater number than the mentioned number without having to explicitly use the adverb "at least". For example, if an element is mentioned, this is to be understood such that there is exactly one element or there are two elements or more elements. Additional features may be added to these features, or these features may be the only features of the respective product.

The reference signs contained in the claims are not limiting the extent of the matter protected by the claims. Their sole function is to make the claims easier to understand.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

To elucidate the technical solutions of the present disclosure more clearly, the drawings used in describing the embodiments will be briefly introduced below. It is apparent that the drawings as described only relate to some embodiments of the present disclosure. To those skilled in the art, different modifications and variations may be derived based on these drawings without exercise of inventive work, wherein.

DETAILED DESCRIPTION

To make the technical solution and advantages of the present disclosure clearer, the technical solution of the present disclosure will be further described with reference to the drawings.

Figure 1:
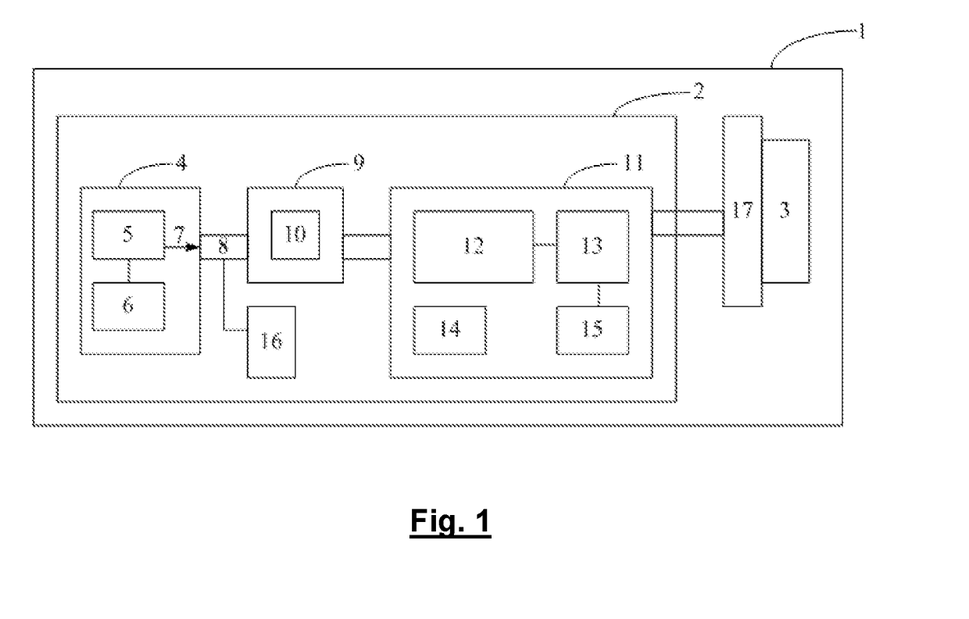
FIG. 1 is a schematic diagram of an electromechanical brake adapted to an electromechanical braking system.

FIG. 1 is a schematic diagram of a disc-type electromechanical brake adapted to an electromechanical braking system. Particularly, an actuator 2 is configured for converting an electric power into an acting force pushing a brake pad 3 towards the brake disc (not shown) to thereby generating a braking force. Various possible transmission systems may be arranged between the actuator 2 and the brake pad 3. For example, a movable thrust plate 17 may be disposed there to transmit the braking force.

The actuator 2 comprises an electric motor 4, the electric motor 4 including a rotor 5 and a stator 6. A driving torque 7 is generated by actuating the rotor 5, the driving torque 7 being transmitted to a transmission unit 9 via an output shaft 8 of the electric motor 4. The transmission unit 9 may play a role of speed reduction and torque boost with an appropriate transmission ratio, e.g., by adopting a planetary gear set 10.

In a power transmission path, an additional transmission unit 11 may be further arranged rear to the transmission unit 9. Exemplarily, the additional transmission unit 11 comprises a roller slope transmission system 12 and/or a thread transmission system 13. The additional transmission unit 11 may convert a rotary motion of the transmission unit 9 to a straight-line motion acting on the thrust plate 17.

Besides, to detect an operating state of the disc brake, sensors are further integrated, for example, a braking force sensor 14 configured for obtaining a magnitude of the braking force, and an angle sensor 15 configured for obtaining a rotating state of the additional transmission unit 11.

Finally, a braking force holding device 16 for locking the output shaft 8 is further provided to hold the braking force in a low power consumption state or in a zero-power consumption state.

When a power-off electromagnetic brake is adopted, the braking force may be held for a long time in a zero-power consumption state. When a power-on electromagnetic brake is adopted, the braking force may be held for a long time in a low power consumption state, and release of the motor shaft may be held in a zero-power consumption state. It needs to be noted that the braking force holding device 16 may also be, for example, a solenoid, a ratchet mechanism, etc.

Embodiment 1

Figure 2:
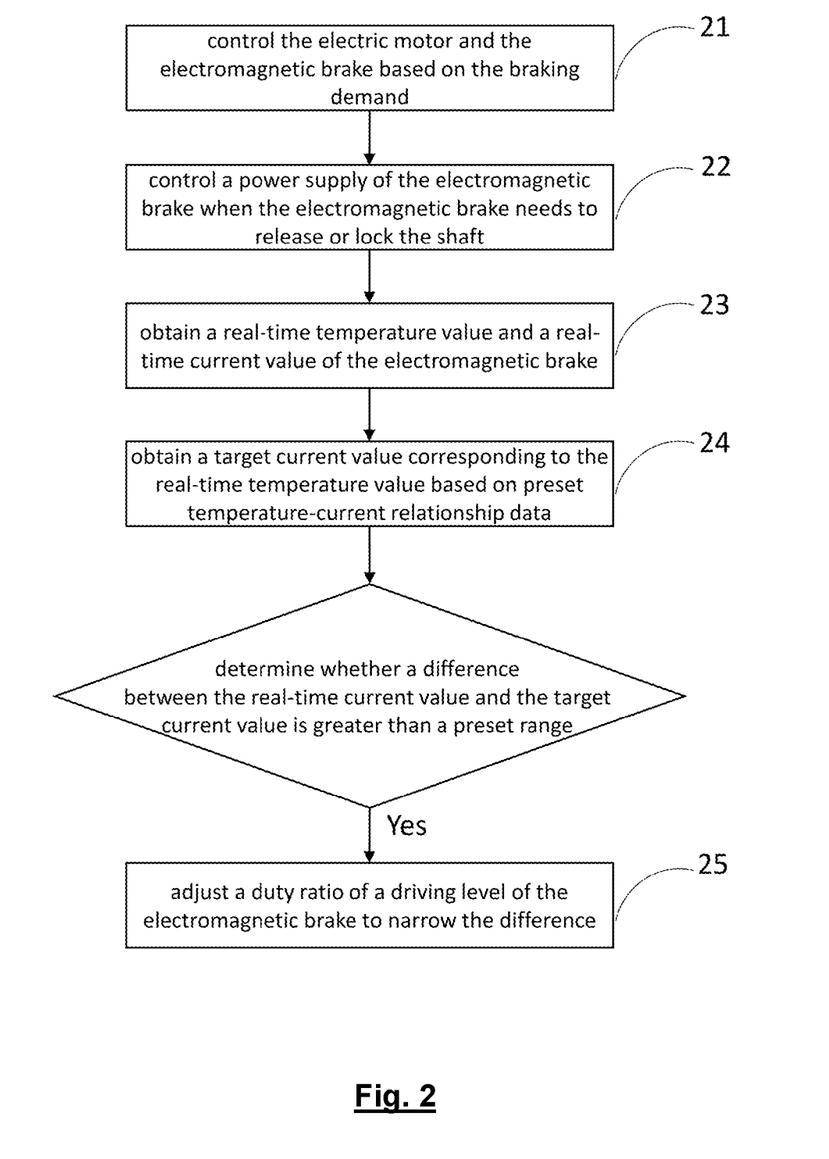
FIG. 2 is a flow schematic diagram of a controlling method for an electromechanical braking system according to the present disclosure.

This embodiment provides a controlling method for an electromechanical brake. As shown in FIG. 2, the electromechanical brake comprises an electric motor and an electromagnetic brake, the electric motor having a shaft and outputting a torque based on a braking demand, the electromagnetic brake being configured for locking and releasing the shaft, wherein the controlling method further comprises:

21. controlling the electric motor and the electromagnetic brake based on the braking demand;
22. controlling a power supply of the electromagnetic brake when the electromagnetic brake needs to release or lock the shaft;
23. obtaining a real-time temperature value and a real-time current value of the electromagnetic brake;
24. obtaining a target current value corresponding to the real-time temperature value based on preset temperature-current relationship data; and
25. when a difference between the real-time current value and the target current value is greater than a preset range, adjusting a duty cycle of a driving voltage level of the electromagnetic brake to narrow the difference.

The controlling method for the electromechanical brake according to this embodiment is for controlling the power supply of the electromagnetic brake. The controlling principle is described as follows: first, obtaining the present real-time temperature value and the real-time current value of the electromagnetic brake, then determining a target current value corresponding to the real-time temperature value, wherein a too large difference between the obtained target current value and the obtained real-time current value indicates that the electromagnetic brake is currently not at a desired operating state, such that it needs to be controlled by adjusting a power supplying manner of the power supply, so as to enable the electromagnetic brake to enter the desired operating state as quickly as possible, thereby reducing power consumption. There are many ways to adjust the power supply. In this embodiment, it is implemented by adjusting the duty cycle of the driving voltage level of the power supply output.

The temperature-current relationship data used in step 24 refer to preset ideal temperature-current correspondence relationships of the electromagnetic brake under different operating states. For example, assuming that the current flowing through the electromagnetic brake under 26° C. is 0.5 A, the electromagnetic brake is in an optimal energy consumption state. The relationship data are pre-stored so as to be invokable during the process of controlling the electromagnetic brake according to steps 21-25.

Considering that the currently available electromagnetic brakes may be differentiated into a power-on braking type and a power-off braking type, the controlling method needs to be separately described based on different operating modes.

1) When the power-on braking type electromagnetic brake is selected:
   when the electromagnetic brake is energized, the electromagnetic brake will lock the shaft in the electric motor; for example, in a parking state, the electromagnetic brake is always in a power-on state; at this point, the controlling method in Embodiment 1 is adopted to adjust power supply to the electromagnetic brake based on an actual temperature so as to avoid energy loss due to a too high duty cycle during the whole parking process.

2) When the power-off braking type electromagnetic brake is selected: when the electromagnetic brake is in a power off state, the electromagnetic brake locks the shaft in the electric motor. However, only when the electromagnetic brake is in a power-on state, will the electromagnetic brake release the motor shaft. In other words, in a non-braking state, the electromagnetic brake might keep power on for a long time; at this point, the controlling method in Embodiment 1 is adopted to adjust power supply to the electromagnetic brake based on an actual temperature, so as to avoid energy loss due to a too high duty cycle during the whole process.

To enable the electromagnetic brake to hold locking or releasing of the shaft with as less energy as possible so as to improve energy efficiency of the braking system, it is needed to obtain real-time parameters of the electromagnetic brake and adjust the power supply which supplies power based on the pre-stored data under a desired operating state; in this way, the electromagnetic brake may be always in an ideal power consumption state, thereby achieving an effect of energy conservation.

Figure 3:
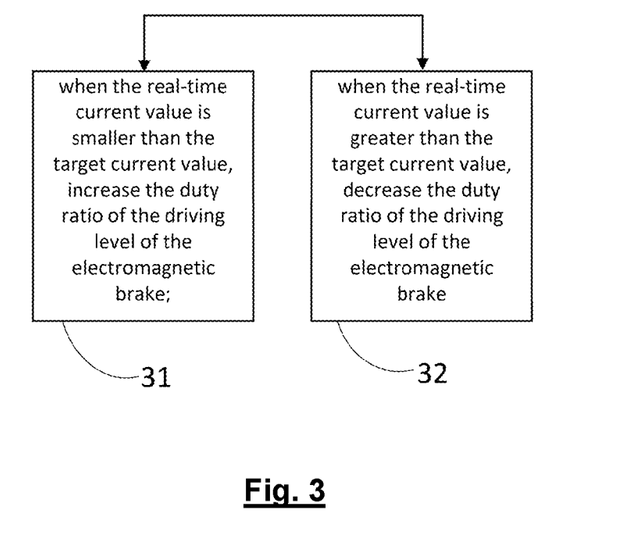
FIG. 3 is a flow schematic diagram of adjusting a duty cycle of a driving voltage level of a power supply according to the present disclosure.

FIG. 3 shows a specific manner of adjusting the duty cycle.

31. When the real-time current value is smaller than the target current value, increasing the duty cycle of the driving voltage level of the electromagnetic brake;

32. When the real-time current value is greater than the target current value, decreasing the duty cycle of the driving voltage level of the electromagnetic brake.

The duty cycle refers to a ratio of the time taken by a pulse within a segment of continuous operating period to the total time. In this embodiment, the duty cycle is the ratio of the actual time taken by the power supply to output a driving voltage level to the total time.

Based on the determination in step 25, if the real-time current value of the current flowing in the electromagnetic brake is smaller than the target current value, in order to maintain the electromagnetic brake at a normal operating condition, the current value of the current flowing in the electromagnetic brake needs to be increased; considering the definition of the duty cycle, it is needed to increase the actual time taken by the power supply to output the driving voltage level, i.e., maintaining power consumption of the electromagnetic brake by increasing the duty cycle. On the contrary, it is needed to reduce the current flowing through the electromagnetic brake by decreasing the duty cycle of the driving voltage level, thereby reducing power consumption of the electromagnetic brake.

Embodiment 2

Embodiment 1 has disclosed the controlling method for adjusting the duty cycle to cause the electromagnetic brake to be in an ideal power consumption state as much as possible; on the basis of Embodiment 1, Embodiment 2 exemplarily provides an operating loop of the electromagnetic brake, and a controlling method for the electromagnetic brake based on the loop.

The duty cycle refers to a ratio of the actual time taken to output the driving voltage level; based on the manner of generating the duty cycle, it is seen that the duty cycle may be adjusted by increasing or decreasing the actual time taken to output the driving voltage level.

Figure 4:
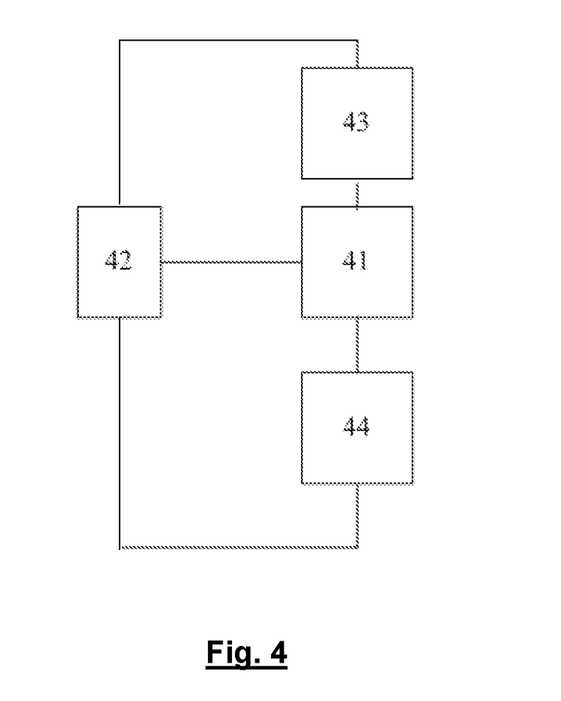
FIG. 4 is a structural schematic diagram of an operating loop of the electromagnetic brake according to the present disclosure.

FIG. 4 shows an operating loop of an electromagnetic brake. In the operating loop, an electromagnetic brake 41 and a power supply 42 powering the electromagnetic brake 41 are provided, wherein the electromagnetic brake 41 has a high side connected to the positive pole of the power supply 42 and a low side connected to a ground end; a high side switch 43 implementing selective circuit conduction is provided between the positive pole of the power supply 42 and the high side of the electromagnetic brake, and a low side switch 44 for implementing selective circuit conduction is provided between the ground end and the low side of the electromagnetic brake.

When the electromagnetic brake is in an operating state, the high side switch 43 and the low side switch 44 will be selectively conducted. To implement adjustment of the duty cycle, the conduction time lengths of the high side switch 43 and the low side switch 44 may be varied to implement variation of duration of the driving voltage level within a single power supply period, thereby implementing adjustment of the duty cycle. In other words, by varying the conduction time length, within a unit time, of the high side switch 43 or low side switch 44, the duty cycle of the driving voltage level of the electromagnetic brake may be adjusted.

Embodiment 3

Based on the preceding embodiments, Embodiment 3 further provides a step of obtaining an initial voltage value of the electromagnetic brake.

The initial voltage value in this embodiment refers to a voltage value of the electromagnetic brake when it starts operating. Obtaining the initial voltage value is to determine whether the electromagnetic brake can enter a normal operating state based on the voltage value. The controlling method described in Embodiment 1 can be executed only when the electromagnetic brake can enter the normal operating state.

After obtaining the initial voltage value, whether the initial voltage value is high or low is determined; if the initial voltage value is beyond a preset range, it indicates that the electromagnetic brake is exceptional, and the driving voltage level outputted by the power supply needs to be adjusted; if necessary, a comprehensive determination is needed in conjunction with the temperature value and the current value of the electromagnetic brake.

Embodiment 4

Figure 5:
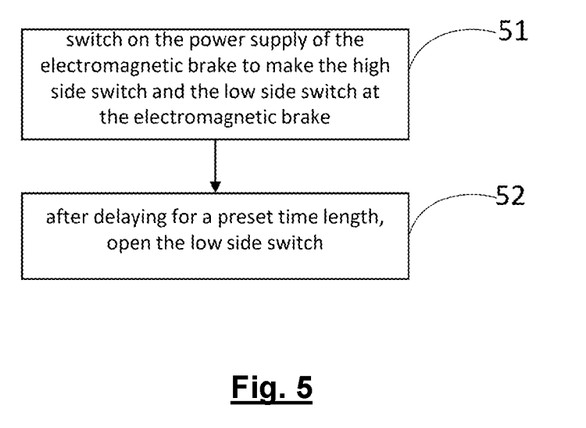
FIG. 5 is a flow schematic diagram of a diagnosing method for an electromechanical brake according to the present disclosure.

Embodiment 4 further provides a method for diagnosing an electromagnetic brake. In conjunction with the operating loop of the electromagnetic brake (as shown in FIG. 4) provided in Embodiment 2, the diagnosing method shown in FIG. 5 comprises:

51. Switching on the power supply of the electromagnetic brake to make the high side switch and the low side switch at the electromagnetic brake;

52. After delaying for a preset time length, opening the low side switch.

After making the high side switch and the low side switch at the electromagnetic brake, a first voltage value at the high side of the electromagnetic brake is obtained, and after the preset time length, a second voltage value of the low side is obtained while the low side switch is opened. The diagnosing method is applied to determine whether a short-circuit or open-circuit fault exists in a loop where the electromagnetic brake is disposed, and voltage values under different switch conduction combinations are obtained by controlling conductions of the high side switch and the low side switch based on preset combinations.

When the first voltage value is at a low level, or the first voltage value and the second voltage value are both at low levels, it is determined that a short-circuit fault exists between the ground end and the low side of the electromagnetic brake. When the first voltage value is at a high level and the second voltage value is at a low level, it is determined that the electromagnetic brake has an open-circuit fault. During the diagnosing process above, after the switch at a certain side is opened for the first time, it needs to be delayed for a certain time, so as to avoid voltage variation in the loop caused by instantaneous making-opening of the switch; the voltage variation would otherwise cause the subsequently obtained second voltage value inaccurate and then cause a misjudgment on the short-circuit fault.

Because short-circuit will cause local over-current and voltage rise, while open-circuit would cause the electromagnetic brake to be unmanipulable, it is needed to determine whether the operating loop has a short-circuit fault or an open-circuit fault based on voltage exception, such that alarm information may be emitted promptly when the fault occurs, which may prevent a brake control error due to electromagnetic brake fault during service of the vehicle.

In this embodiment, the voltage values are obtained from different positions in the operating loop, such that they may characterize actual conditions of more positions in the operating loop; therefore, compared with a conventional method of determining short-circuit simply based on voltage, the present disclosure may determine specific fault positions in the operating loop based on the obtained voltage values, thereby offering a higher accuracy. What has been described above is an exemplary diagnosis manner. By switching on or off the high side switch and the low side switch with different sequences and times and obtaining corresponding voltage values, a plurality of faults may be diagnosed.

In step 25 of Embodiment 1, the difference between the real-time current value and the target current value is compared with a preset range, and a comparison result is used as a basis for determining whether it is needed to adjust the duty cycle of the driving voltage level of the electromagnetic brake.

The preset range here serves as the basis for determining whether to adjust the duty cycle; during the process of cyclically executing steps 21-25, the preset range in use may also be dynamically adjusted based on power supply of the electromagnetic brake.

For example, when the duty cycle of the driving voltage level outputted by the power supply decreases, it causes decrease of the actual input voltage of the electromagnetic brake and further causes decrease of the current flowing through the electromagnetic brake. To match a varied current, it is needed to specifically narrow the preset range; in this way, during the subsequent process of adjusting the duty cycle based on step 25, power consumption of the electromagnetic brake may be decreased more quickly.

On the contrary, when the duty cycle of the driving voltage level outputted by the power supply increases, it indicates that the actual voltage inputted into the electromagnetic brake increases, which further causes increase of the current flowing through the electromagnetic brake. To match a varied current, it is needed to specifically broaden the preset range; in this way, during the subsequent process of adjusting the duty cycle based on step 25, the preset range may correspond to the increased current value, thereby reducing power consumption of the electromagnetic brake more quickly.

Embodiment 5

Figure 6:
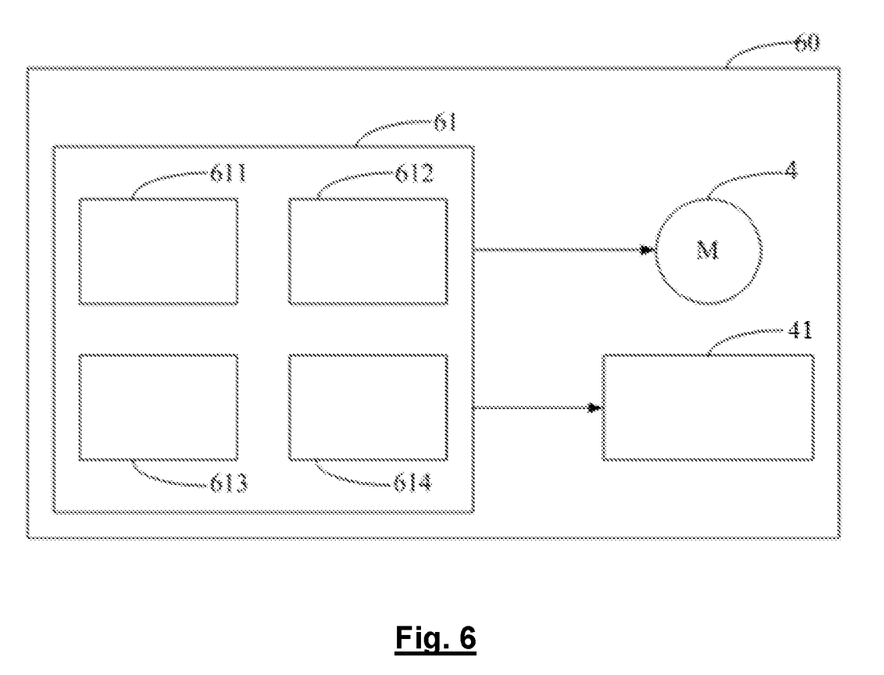
FIG. 6 is a first structural schematic diagram of a control device of an electromechanical brake according to the present disclosure.

This embodiment provides an electromechanical brake 60 comprising a control device 61. As shown in FIG. 6, the electromechanical brake 60 comprises an electric motor 4 and an electromagnetic brake 41, the electric motor 4 having a shaft and outputting a torque based on a braking demand, the electromagnetic brake 41 being configured for locking and releasing the shaft, wherein the control device 61 further comprises:

A state control unit 611 configured for controlling the electric motor and the electromagnetic brake based on the braking demand;

A power supply control unit 612 configured for controlling a power supply of the electromagnetic brake when the electromagnetic brake needs to release or lock the shaft;

A parameter obtaining unit 613 configured for obtaining a real-time temperature value and a real-time current value of the electromagnetic brake;

A current value obtaining unit 614 configured for obtaining a target current value corresponding to the real-time temperature value based on preset temperature-current relationship data; and A duty cycle adjusting unit 615 configured for: when a difference between the real-time current value and the target current value is greater than a preset range, adjusting a duty cycle of a driving voltage level of the electromagnetic brake to narrow the difference.

The controlling device 61 of the electromechanical brake according to this embodiment is configured for controlling the power supply of the electromagnetic brake. The implementation principle of the control device 61 is described as follows: first, obtaining the present real-time temperature value and the real-time current value of the electromagnetic brake, then determining a target current value corresponding to the real-time temperature value, wherein a too large difference between the obtained target current value and the obtained real-time current value indicates that the electromagnetic brake is currently not at a desired operating state, such that the duty cycle adjusting unit 615 needs to be invoked to control the electromagnetic brake by adjusting a power supplying manner of the power supply, so as to enable the electromagnetic brake to enter the desired operating state as quickly as possible, thereby reducing power consumption. There are many ways of adjusting the power supply. In this embodiment, it is implemented by adjusting the duty cycle of the driving voltage level outputted by the power supply.

The temperature-current relationship data used by the current value obtaining unit 614 refer to preset ideal temperature-current correspondence relationships of the electromagnetic brake under different operating states. For example, assuming that the current flowing through the electromagnetic brake under 26° C. is 0.5 A, the electromagnetic brake is in an optimal energy consumption state. The relationship data are pre-stored so as to be retrievable during the process of controlling the electromagnetic brake.

Considering that the currently available electromagnetic brakes may be differentiated into a power-on braking type and a power-off braking type, the controlling method needs to be separately described based on different operating modes.

1) When the power-on braking type electromagnetic brake is selected:
when the electromagnetic brake is energized, the electromagnetic brake will lock the shaft in the electric motor; for example, in a parking state, the electromagnetic brake is always in a power-on state; at this point, the control device 61 adjusts power supply to the electromagnetic brake based on an actual temperature, thereby avoiding energy loss due to a too high duty cycle during the whole parking process.

2) When the power-off braking type electromagnetic brake is selected:
when the electromagnetic brake is in a power off state, the electromagnetic brake locks the shaft in the electric motor. However, only when the electromagnetic brake is in a power-on state, will the electromagnetic brake release the motor shaft. In other words, in a non-braking state, the electromagnetic brake might keep power on for a long time; at this point, the control device 61 adjusts power supply based on an actual temperature so as to avoid energy loss due to a too high duty cycle during the whole process.

To enable the electromagnetic brake to hold locking or releasing of the shaft with as less energy as possible so as to improve energy use efficiency of the braking system, the power supply which supplies power to the electromagnetic brake is adjusted based on the pre-stored data under a desired operating state; in this way, the electromagnetic brake may be always in an ideal power consumption state, thereby achieving an effect of energy conservation.

The duty cycle refers to a ratio of the time taken by a pulse within a segment of continuous operating period to the total time. In this embodiment, the duty cycle is the ratio of the actual time taken by the power supply to output the driving voltage level to the total time.

The duty cycle adjusting unit 615 of the control device 61 adjusts the duty cycle specifically in the following manner: if the real-time current value of the current flowing in the electromagnetic brake is smaller than the target current value, in order to maintain the electromagnetic brake at a normal operating condition, the current value of the current flowing in the electromagnetic brake needs to be increased; considering the definition of the duty cycle, it is needed to increase the actual output time taken by the power supply to output the driving voltage level, i.e., maintaining the power consumption of the electromagnetic brake by increasing the duty cycle. On the contrary, it is needed to reduce the current flowing through the electromagnetic brake by decreasing the duty cycle of the driving voltage level, thereby reducing power consumption of the electromagnetic brake.

The duty cycle adjusting unit 615 is configured for executing the above manner of adjusting the duty cycle based on current. Specifically, the duty cycle of the driving voltage level of the electromagnetic device is adjusted by varying a conduction time length, within a unit time, of a low side switch at the electromagnetic brake. If it is needed to increase the current value of the current flowing in the electromagnetic brake, the duty cycle needs to be increased by prolonging the conduction time length, within a unit time, of the low side switch at the electromagnetic brake, so as to maintain power consumption of the electromagnetic brake. On the contrary, it is needed to shorten the conduction time length, within a unit time, of the low side switch at the electromagnetic brake; in this way, by decreasing the duty cycle of the driving voltage level, the current flowing through the electromagnetic brake is reduced, thereby reducing power consumption of the electromagnetic brake.

Embodiment 6

Embodiment 5 has described a controlling device of an electromechanical brake, the controlling device enables adjusting the duty cycle to cause the electromagnetic brake to be in an ideal power consumption state as much as possible; based on Embodiment 5, Embodiment 6 exemplarily provides an operating loop of the electromagnetic brake, and a controlling device of the loop-based electromagnetic brake.

The duty cycle refers to a ratio of the actual time taken to output the driving voltage level to the total time; based on the manner of generating the duty cycle, it is seen that the duty cycle may be adjusted by increasing or decreasing the actual time taken to output the driving voltage level.

FIG. 4 shows an operating loop of an electromagnetic brake. In the operating loop, an electromagnetic brake 41 and a power supply 42 powering the electromagnetic brake 41 are provided, wherein the electromagnetic brake 41 is provided with a high side connected to the positive pole of the power supply 42 and a low side connected to a ground end; a high side switch 43 implementing selective circuit conduction is provided between the positive pole of the power supply 42 and the high side of the electromagnetic brake, and a low side switch 44 for implementing selective circuit conduction is provided between the ground end and the low side of the electromagnetic brake.

When the electromagnetic brake is in an operating state, the high side switch 43 and the low side switch 44 will be selectively conducted. To implement adjustment of the duty cycle, the conduction time lengths of the high side switch 43 and the low side switch 44 may be varied to implement variation of the driving voltage level duration within a single power supply period. In other words, by varying the conduction time length, within a unit time, of the high side switch 43 or low side switch 44, the duty cycle of the driving voltage level of the electromagnetic brake may be adjusted.

Embodiment 7

Figure 7:
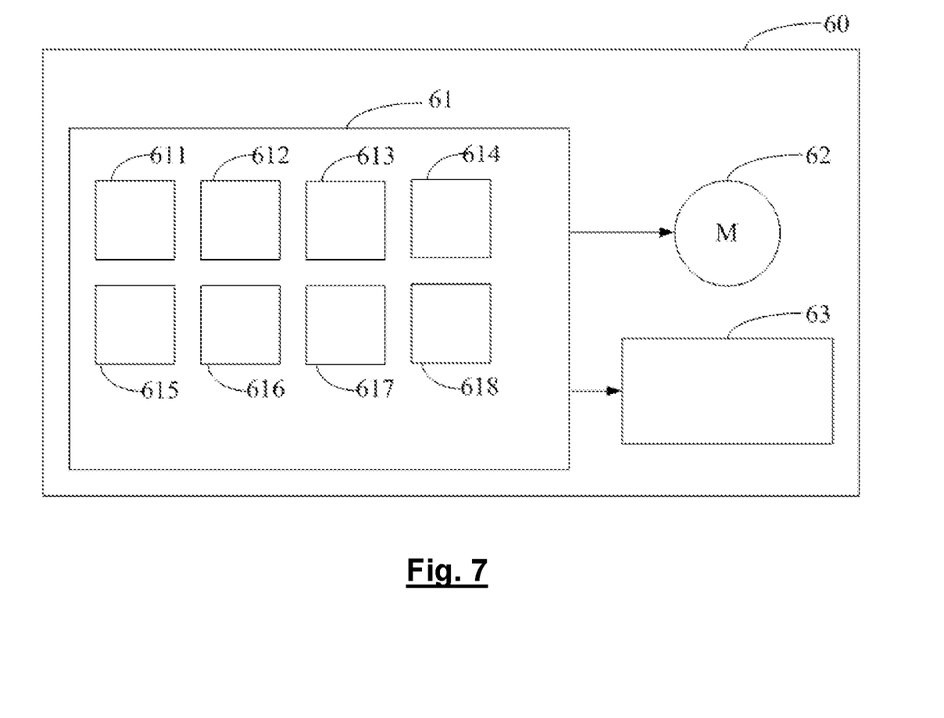
FIG. 7 is a second structural schematic diagram of a control device of an electromechanical brake according to the present disclosure.

Based on any one of the preceding embodiments, Embodiment 7 further provides a control device for obtaining an initial voltage value of the electromagnetic brake. The control device 61 shown in FIG. 7 further comprises: a voltage value obtaining unit 616 configured for obtaining an initial voltage value of the electromagnetic brake.

The initial voltage value in this embodiment refers to a voltage value of the electromagnetic brake when it starts operating. Obtaining the initial voltage value is to determine whether the electromagnetic brake can enter a normal operating state based on the voltage value. Only when the electromagnetic brake can enter the normal operating state, can the motor shaft be locked or released thereby.

After obtaining the initial voltage value, it may be determined whether the initial voltage value is high or low; if the initial voltage value is beyond a preset range, it indicates that the electromagnetic brake is exceptional, and the driving voltage level outputted by the power supply needs to be adjusted; if necessary, a comprehensive determination is further needed in conjunction with the temperature value and the current value of the electromagnetic brake.

Embodiment 8

Embodiment 8 further provides a control device for diagnosing an electromagnetic brake. In conjunction with the operating loop of the electromagnetic brake (as shown in FIG. 4) provided in Embodiment 6, the control device 61 shown in FIG. 8 comprises: a diagnosing unit 617, which performs diagnosis based on voltage values when a high side switch and a low side switch at the electromagnetic brake are switched on or off.

Figure 8:
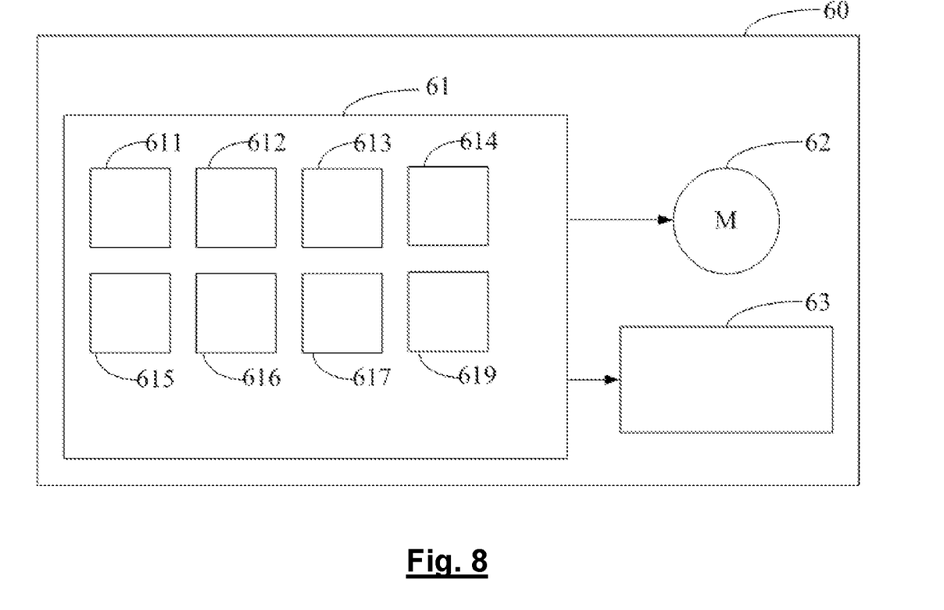
FIG. 8 is a third structural schematic diagram of a control device of an electromechanical brake according to the present disclosure.

A diagnosing flow of the diagnosing unit 617 is described as follows:
(1) switching on a power supply of the electromagnetic brake to make the high side switch and the low side switch at the electromagnetic brake;
(2) after delaying for a preset time length, opening the low side switch.

After making the high side switch and the low side switch at the electromagnetic brake, a first voltage value at the high side of the electromagnetic brake is obtained, and after the preset time length, a second voltage value of the low side is obtained while the low side switch is opened.

The diagnosing unit 617 is configured for determining whether a short-circuit or open-circuit fault exists in a loop where the electromagnetic brake is disposed, and voltage values under different switch conduction combinations are obtained by controlling, based on preset combinations, conductions of the high side switch and the low side switch.

When the first voltage value is at a low level, or the first voltage value and the second voltage value are both at low levels, it is determined that a short-circuit fault exists between a ground end and the low side of the electromagnetic brake. When the first voltage value is at a high level and the second voltage value is at a low level, it is determined that the electromagnetic brake has an open-circuit fault. During the diagnosis process above, after the switch at a certain side is opened for the first time, it needs to be delayed for a certain time, so as to avoid voltage variation in the loop caused by instantaneous making-opening of the switch; the voltage variation would otherwise cause the subsequently obtained second voltage value inaccurate and then cause a misjudgment on the short-circuit fault.

Because short-circuit will cause local over-current and voltage rise, while open-circuit would cause the electromagnetic brake to be unmanipulable, it is needed to determine whether the operating loop has a short-circuit fault or an open-circuit fault based on voltage exception, such that alarm information may be emitted promptly when the fault occurs, thereby preventing a brake control error due to electromagnetic brake fault during use of the vehicle.

In this embodiment, the voltage values are obtained from different positions in the operating loop, such that they may characterize actual conditions of more positions in the operating loop; therefore, compared with a conventional method which determines short-circuit simply based on voltage, the present disclosure may determine the specific fault position in the operating loop based on the obtained voltage values, thereby offering a higher accuracy. What has been described above is an exemplary diagnosis manner. By switching on or off the high side switch and the low side switch with different sequences and times and obtaining corresponding voltage values, a plurality of faults may be diagnosed.

In Embodiment 5, it has been described that the duty cycle adjusting unit 615 is configured for comparing the difference between the real-time current value and the target current value with a preset range, and a comparison result is used as a basis for determining whether it is needed to adjust the duty cycle of the driving voltage level of the electromagnetic brake.

The preset range here serves as the basis for determining whether to adjust the duty cycle, which may also be dynamically adjusted based on power supply of the electromagnetic brake.

For example, when the duty cycle of the driving voltage level outputted by the power supply decreases, it causes decrease of the actual voltage inputted into the electromagnetic brake and further causes decrease of the current flowing through the electromagnetic brake. To match a varied current, it is needed to specifically narrow the preset range; in this way, during the subsequent process of adjusting the duty cycle by the duty cycle adjusting unit 615, power consumption of the electromagnetic brake may be decreased more quickly.

On the contrary, when the duty cycle of the driving voltage level outputted by the power supply increases, it indicates that the actual voltage inputted into the electromagnetic brake increases, thereby further increasing the current flowing through the electromagnetic brake. To match a varied current, it is needed to specifically broaden the preset range; in this way, during the subsequent process of adjusting the duty cycle by the duty radio adjusting unit 615, the preset range may correspond to the increased current value, thereby reducing power consumption of the electromagnetic brake more quickly.

Embodiment 9

This embodiment further provides an electromechanical braking system, comprises: electromechanical brakes corresponding to wheels, each of the electromechanical brakes including the control device according to any one of Embodiments 5 to 8.

The electromagnetic brake for locking the electric motor according to this embodiment may be a permanent magnet brake, comprising a stator that cannot rotate with a motor shaft and a rotor that rotates synchronously with the motor shaft. When the electric motor operates normally, an electromagnetic force is generated by energizing an electromagnet of the permanent magnet brake so as to neutralize the magnetic force of the permanent magnet, which makes an air gap by causing the stator to be separated from the rotor or an armature connected to the rotor by springs, such that the motor shaft rotates freely. When it is needed to lock the electric motor, power supply of the electromagnet is interrupted; then the stator and the rotor or the armature connected to the rotor by springs are attracted together due to the magnetic force of the permanent magnet, which produces friction, and then the motor shaft is fixed as the rotor is locked. Adoption of the permanent magnet brake may reduce energy consumption for locking the electric motor; therefore, it may be applied to a scenario where the braking force needs to be held, e.g., parking or maintaining a long-time service braking force. However, the present disclosure is not limited thereto. Any electromagnetic brake type, which generates a mechanical friction leveraging an electromagnetic effect to decelerate or lock motor motion, is applicable to the present disclosure.

What have been described above are only embodiments of the present disclosure. any modifications, equivalent substitutions, and improvements within the spirit and principle of the present disclosure should be included within the protection scope of the present disclosure.

Many variations and modifications may be made to the preferred embodiments of the invention without departing substantially from the spirit and principles of the invention. All such modifications and variations are intended to be included herein within the scope of the present invention, as defined by the following claims.

We claim:
1. A controlling method for an electromechanical brake, the electromechanical brake comprising an electric motor and an electromagnetic brake, the electric motor having a shaft and outputting a torque based on a braking demand, and the electromagnetic brake being configured for locking and releasing the shaft, wherein the controlling method comprises:
   controlling the electric motor and the electromagnetic brake based on the braking demand;

controlling a power supply of the electromagnetic brake when the electromagnetic brake needs to release or lock the shaft;

obtaining a real-time temperature value and a real-time current value of the electromagnetic brake;

obtaining a target current value corresponding to the real-time temperature value based on preset temperature-current relationship data; and when a difference between the real-time current value and the target current value is greater than a preset range, adjusting a duty cycle of a driving voltage level of the electromagnetic brake to narrow the difference.

2. The controlling method according to claim 1, wherein when the real-time current value is smaller than the target current value, increasing the duty cycle of the driving voltage level of the electromagnetic brake; and when the real-time current value is greater than the target current value, decreasing the duty cycle of the driving voltage level of the electromagnetic device.

3. The controlling method according to claim 2, wherein the duty cycle of the driving voltage level of the electromagnetic device is adjusted by varying a conduction time length, within a unit time, of a low side switch at the electromagnetic brake.

4. The controlling method according to claim 1, wherein the duty cycle of the driving voltage level of the electromagnetic device is adjusted by varying a conduction time length, within a unit time, of a low side switch at the electromagnetic brake.

5. The controlling method according to claim 1, wherein the controlling method further comprises: obtaining an initial voltage value of the electromagnetic brake.

6. The controlling method according to claim 1, wherein the controlling method further comprises: diagnosing the electromagnetic brake.

7. The controlling method according to claim 6, wherein the diagnosing is performed based on voltage values when a high side switch and the low side switch provided at the electromagnetic brake are switched on or off.

8. The controlling method according to claim 1, wherein the preset range is dynamically adjusted based on power supply of the electromagnetic brake.

9. An electromechanical brake, the electromechanical brake comprising:
a control device,
an electric motor and
an electromagnetic brake,
the electric motor having a shaft and outputting a torque based on a braking demand,
the electromagnetic brake being configured for locking and releasing the shaft, the control device further comprising:
a state control unit configured for controlling the electric motor and the electromagnetic brake based on the braking demand;
a power supply control unit configured for controlling power supply of the electromagnetic brake when the electromagnetic brake needs to release or lock the shaft;
a parameter obtaining unit configured for obtaining a real-time temperature value and a real-time current value of the electromagnetic brake;
a current value obtaining unit configured for obtaining a target current value corresponding to the real-time temperature value based on preset temperature-current relationship data; and
a duty cycle adjusting unit configured for: when a difference between the real-time current value and the target current value is greater than a preset range, adjusting a duty cycle of a driving voltage level of the electromagnetic brake to narrow the difference.

10. The electromechanical brake according to claim 9, wherein the duty cycle adjusting unit is configured for: when the real-time current value is smaller than the target current value, increasing the duty cycle of the driving voltage level of the electromagnetic brake; and when the real-time current value is greater than the target current value, decreasing the duty cycle of the driving voltage level of the electromagnetic device.

11. The electromechanical brake according to claim 10, wherein the duty cycle adjusting unit is configured for adjusting the duty cycle of the driving voltage level of the electromagnetic device by varying a conduction time length, within a unit time, of the low side switch at the electromagnetic brake.

12. The electromechanical brake according to claim 9, wherein the duty cycle adjusting unit is configured for adjusting the duty cycle of the driving voltage level of the electromagnetic device by varying a conduction time length, within a unit time, of the low side switch at the electromagnetic brake.

13. The electromechanical brake according to claim 9, wherein the electromechanical brake further comprises: a voltage value obtaining unit configured for obtaining an initial voltage value of the electromagnetic brake.

14. The electromechanical brake according to claim 9, wherein the electromechanical brake further comprises a diagnosing unit configured for diagnosing the electromagnetic brake.

15. The electromechanical brake according to claim 14, wherein the diagnosing unit performs the diagnosing based on voltage values when a high side switch and a low side switch provided at the electromagnetic brake are switched on or off.

16. The electromechanical brake according to claim 9, wherein the preset range is dynamically adjusted based on power supply of the electromagnetic brake.

17. An electromechanical braking system, comprising a plurality of the electromechanical brakes according to claim 9, each of the electromechanical brakes corresponding to a vehicle wheel.

* * * * *